United States Patent [19]
Pantzer et al.

[11] 4,089,690
[45] May 16, 1978

[54] CORROSION INHIBITING COATINGS FOR STEEL

[75] Inventors: Rüdiger Pantzer, Stuttgart; Josef Ruf, Ditzingen, both of Germany

[73] Assignee: BASF Farben & Fasern AG, Hamburg, Germany

[21] Appl. No.: 646,036

[22] Filed: Jan. 2, 1976

[30] Foreign Application Priority Data

Jan. 24, 1975 Germany ............................ 2502781

[51] Int. Cl.² .............................................. C09D 5/08
[52] U.S. Cl. .................................. 106/14.23; 106/254; 106/292; 252/387; 260/38; 260/40 R; 427/372 R

[58] Field of Search ......................... 106/14, 254, 292; 252/79.4, 387, 396, 42.7, 407; 260/2 A, 644, 645, 515 P; 427/372 R

[56] References Cited

U.S. PATENT DOCUMENTS 3,801,517  4/1974  Richwine ............................ 260/2 A

FOREIGN PATENT DOCUMENTS 2,204,985  6/1973  Germany.

Primary Examiner—Lorenzo B. Hayes

[57] ABSTRACT

The zinc salts of 5-nitroisophthalic acid and of mononitroterephthalic acid inhibit the corrosion of steel when applied in otherwise conventional organic coatings.

6 Claims, No Drawings

CORROSION INHIBITING COATINGS FOR STEEL

This invention relates to the protection of metals against corrosion, and particularly to coating compositions capable of inhibiting the corrosion of steel and to a method of inhibiting the corrosion of steel by means of such coatings.

The rust inhibiting properties of red lead, strontium chromate, basic lead silico-chromate, zinc yellow, and other inorganic pigments have been known for a long time. More recently, heavy metal salts of organic acids were proposed for the same purpose, more specifically the zinc and lead salts of 3-nitro- and 4-nitrophthalic acid, mixtures of these isomers, and dinitrophthalic acids (German Pat. No. 2,204,985).

While the organic acid salts have been found superior in their anticorrosive effects, they have not replaced the older pigments to the extent expected from their qualities because they tend to produce occasional blisters in the coating of organic film-forming material in which they are applied, and thus to be locally ineffective. While the mechanism of blister formation has not been fully elucidated, it appears to be due to residual impurities in the heavy metal salts introduced during their manufacture and not capable of being removed at practical cost.

A primary object of the invention is the provision of protective coatings for steel which not only inhibit the corrosion of the substrate where in contact with the same, but also maintain such contact over extended periods without mechanical failure of the coating as by blister formation.

It has now been found that the zinc and lead salts of 5-nitroisophthalic acid and of mononitroterephthalic acid are superior to the known nitrophthalates in equal amounts as corrosion inhibiting ingredients of organic protective coatings on steel, that readily available commercial grades of these compounds do not adversely affect adhesion and strength of the coatings, and that they are less soluble in water than the known salts and therefore more durable in their effects where coatings are in contact with water.

The advantages of the zinc and lead salts of the invention are evident from the following Example.

EXAMPLE

11 Air-drying coating compositions were prepared from 25% medium oil alkyd resin, 16% micronized talcum, other ingredients as listed in the Table below, and solvent to make 100%, all percentage values being by weight. The pigment volume concentration (PVC) of all compositions was approximately 37%.

Bright sheet specimens of deep-drawing steel were coated to a precisely uniform thickness with the several coating compositions by means of a centrifugal coating machine and air-dried for seven days. Specimens of each coating were thereafter subjected to salt spray testing according to ASTM Standard B-117-64 for 200 hours and to steam chest testing according to German Industrial Standard DIN 50018 for twelve cycles with 0.2 liter $SO_2$. The corrosion protection value (CPV) was calculated from the test results and expressed as % CPV according to German Industrial Standard DIN 53 210, as published in "Farbe und Lack", 75 (1969), 945. The rules for reproducibility of the results established in the same publication were carefully followed. Oven-drying at 120° C for 30 minutes instead of protracted air drying at ambient temperature did not affect the results.

In the Table, corrosion inhibiting pigments (corr. inh. pigm.) are identified by capital letters as follows:

TABLE

| Comp'n No. | 1 | 2 | 3 | 4 | 5 | 6 | 7 | 8 | 9 | 10 | 11 |
|---|---|---|---|---|---|---|---|---|---|---|---|
| $TiO_2$, % | 14 | 10.8 | 11 | 12 | 10.8 | 11 | 12 | 9.5 | 12 | 9.5 | 10.8 |
| Barytes, % | 16 | 18 | 18 | 18 | 18 | 18 | 18 | 18 | 18 | 18 | 18 |
| Corr. inh. pigm. | A | B | C | C | D | E | E | F | F | G | G |
| % Corr. inh. pigm. | 2.0 | 1.2 | 2.0 | 1.0 | 1.2 | 2.0 | 1.0 | 2.5 | 1.0 | 2.5 | 1.0 |
| CPV, % | 31 | 71 | 64 | 52 | 72 | 71 | 64 | 71 | 65 | 70 | 64 |

A zinc potassium chromate (DIN 55 902)
B lead nitrophthalate (German Patent No. 2,204,985)
C zinc nitrophthalate (German Patent No. 2,204,985)
D lead 5-nitroisophthalate (prepared from 1 mole acid and 1 mole PbO)
E zinc 5-nitroisophthalate (prepared from 1 mole acid and 3 moles ZnO)
F zinc lead 5-nitroisophthalate (prepared from 2.5 moles ZnO, 0.5 mole PbO, and 1 mole acid)
G zinc nitroterephthalate (prepared from 1 mole acid and 3 moles ZnO)

As is evident from the Table, the zinc and lead salts of this invention and the nitrophthalates previously recommened are greatly superior to equal amounts of zinc potassium chromate (A) which is a commonly used rust inhibitor. In equal amounts, lead 5-nitroisophthalate (D) gives slightly, but significantly greater corrosion protection than the known lead nitrophthalate (B). Much greater improvement is found in the zinc salts (E, F, G) of this invention as compared to the zinc nitrophthalate (C) of the cited German patent, and the relatively non-toxic zinc 5-nitroisophthalate and zinc nitroterephthalate achieve rust protection available heretofore only with comparable amounts of toxic lead salts. A zinc salt, of course, contains less heavy metal than an equal weight of lead salt.

The organic film-forming constituent of coatings containing the corrosion inhibiting salts of the invention does not affect the chemical action of the salts. Thus, airdrying compositions based on linseed oil, phenolic resin-drying oil varnish, long oil-alkyd vehicles, or vinyl resins benefit greatly from the salts of the invention, as do baking short or medium oil-alkyd vehicles and amino resin-alkyd vehicles. The solvent medium is chosen to suit the organic material in a conventional manner.

The amount of lead or zinc salt of the invention incorporated in a vehicle is chosen in a conventional manner to suit the specific application, and influences the corrosion inhibiting effects of a coating in the expected manner, as is partly evident from the Table. Since other factors, such as the nature of the vehicle, the thickness of coating applied to the steel, the presence or absence of top coatings, the severity of intended service, the desired improvement, and other factors may vary greatly from case to case, formulating the coatings according to the invention requires the usual amount of experimentation, and the concentrations of lead and zinc salts in the Table may provide guidance for initiating such experimentation.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a coating composition capable of inhibiting corrosion of steel coated therewith, the composition essentially consisting of an airdrying or baking coating vehicle and a corrosion inhibiting pigment, the improvement which consists in said pigment including an amount of a zinc salt of an acid selected from the group consisting of 5-nitroisophthalic acid and mononitroterephthalic acid, said amount being effective in inhibiting corrosion of the coated steel.

2. In a composition as set forth in claim 1, said vehicle including a film-forming organic material and a volatile liquid solvent medium, said organic material being dissolved in said medium.

3. In a composition as set forth in claim 1, said zinc salt being a basic zinc salt.

4. In a composition as set forth in claim 1, said acid being 5-nitroisophthalic acid.

5. In a composition as set forth in claim 1, said acid being monoitroterephthalic acid.

6. A method of inhibiting the corrosion of a steel object which comprises applying to a surface of said object a layer of a composition as set forth in claim 1, and volatilizing said solvent medium.

* * * * *